United States Patent
Chen

(10) Patent No.: US 12,302,856 B1
(45) Date of Patent: May 20, 2025

(54) CAT LITTER BOX CONVENIENT FOR TAKING OUT AND LOCKING CAT LITTER BIN

(71) Applicant: Changxiang Chen, Zhejiang (CN)

(72) Inventor: Changxiang Chen, Zhejiang (CN)

( * ) Notice: Subject to any disclaimer, the term of this patent is extended or adjusted under 35 U.S.C. 154(b) by 0 days.

(21) Appl. No.: 19/029,571

(22) Filed: Jan. 17, 2025

(51) Int. Cl.
*A01K 1/01* (2006.01)

(52) U.S. Cl.
CPC .................................... *A01K 1/011* (2013.01)

(58) Field of Classification Search
CPC .... A01K 1/0114; A01K 1/011; A01K 1/0128; A01K 1/0132
See application file for complete search history.

(56) References Cited

U.S. PATENT DOCUMENTS

| | | | | |
|---|---|---|---|---|
| 5,048,465 A | * | 9/1991 | Carlisi | A01K 1/011 119/161 |
| 5,226,388 A | * | 7/1993 | McDaniel | A01K 1/0114 119/166 |
| 6,082,302 A | * | 7/2000 | Thaler | A01K 1/0114 119/161 |
| 6,202,595 B1 | * | 3/2001 | Atcravi | A01K 1/0114 119/165 |
| 6,205,954 B1 | * | 3/2001 | Bogaerts | A01K 1/0114 119/166 |
| 6,863,026 B2 | * | 3/2005 | Northrop | A01K 1/0114 119/166 |
| 7,051,678 B2 | * | 5/2006 | Strickland | A01K 1/0114 119/165 |
| 7,762,213 B2 | * | 7/2010 | Cook | A01K 1/0114 119/161 |
| 8,109,237 B1 | * | 2/2012 | Tsengas | A01K 1/0114 119/616 |
| 11,000,007 B2 | * | 5/2021 | Ward | A01K 1/0107 |
| 11,457,604 B1 | * | 10/2022 | Fan | A01K 1/0114 |
| 12,114,644 B2 | * | 10/2024 | Holm | H04N 23/57 |
| 2007/0056521 A1 | * | 3/2007 | Caputa | A01K 1/011 119/166 |

(Continued)

FOREIGN PATENT DOCUMENTS

| | | | | |
|---|---|---|---|---|
| CN | 115135145 A | * | 9/2022 | ........... A01K 1/0114 |
| CN | 118985457 A | * | 11/2024 | ............. A01K 1/011 |
| JP | 3236372 U | * | 2/2022 | ............. A01K 1/011 |

OTHER PUBLICATIONS

Animal waste disposal apparatus (Year: 2022).*
Automatic cat sand basin (Year: 2024).*
Pet toilet (Year: 2022).*

*Primary Examiner* — Yvonne R Abbott-Lewis

(57) ABSTRACT

The invention relates to a cat litter box, wherein a bin is in a top opening of a casing, the first rotating shaft is in the side wall of the casing corresponding to the first end of the bin, the first rotating shaft is provided with the first clamping part towards the first end of the bin, and the inner edge of the top opening of the casing is provided with the first opening corresponding to the first clamping part, and the first end of the bin is clamped at the first clamping part of the first rotating shaft; When the bin rotates to the point where the first end of the bin is clamped with the first clamping part of the first rotating shaft corresponding to the first opening, the bin and the casing are in a separable unlocked state; If not, they are in a locked state.

20 Claims, 10 Drawing Sheets

(56) References Cited

U.S. PATENT DOCUMENTS

| | | | |
|---|---|---|---|
| 2010/0095898 A1* | 4/2010 | Cook | A01K 1/0114 |
| | | | 119/166 |
| 2014/0069343 A1* | 3/2014 | Loveday | A01K 1/0132 |
| | | | 119/166 |
| 2015/0173323 A1* | 6/2015 | Plazarte | A01K 1/011 |
| | | | 119/166 |
| 2021/0251182 A1* | 8/2021 | Anderson | A01K 1/011 |
| 2023/0371465 A1* | 11/2023 | Kim | A01K 1/0114 |
| 2024/0196855 A1* | 6/2024 | Graves | A01K 1/011 |

* cited by examiner

CAT LITTER BOX CONVENIENT FOR TAKING OUT AND LOCKING CAT LITTER BIN

TECHNICAL FIELD

The invention relates to the technical field of pet tools, in particular to a cat litter box convenient for taking out and locked the cat litter bin.

BACKGROUND OF THE PRESENT INVENTION

Cat litter box is a container designed to collect cat feces for domestic pet cats. With the popularity of cats as pets, there are various types of cat litter boxes in the market, ranging from traditional open design to automatic cleaning design, which meet the needs of different pet owners for convenience, cleanliness and pet comfort level. The traditional cat litter box relies on cat litter to absorb the urine and feces of cats, and cat owners need to clean the waste in the cat litter box regularly to keep it clean and odorless. However, the cleaning of the litter box is usually complicated, especially for families owning many cats, and it is even more challenging. Therefore, the automatic cat litter box which is more convenient to clean came into being. Generally, it automatically cleans the solid waste in the cat litter box through electric devices, which reduces the workload of pet owners to some extent.

In some related technologies, the automatic cat litter box is usually a closed bin, and the cat litter bin is located in it, and the litter is placed in the litter box, usually only a small entrance and exit for the cat. However, the structure of the cat litter bin is generally not easy to disassemble and clean. Because the inner wall of the cat litter bin is easy to breed bacteria when it comes into contact with feces for a long time, and the relatively closed space formed by the existing cat litter bin causes odor to gather in the cat litter bin and many cats to resist entering. This causes great trouble to users.

SUMMARY OF PRESENT INVENTION

In view of this, the embodiment of the invention provides a cat litter box convenient for taking out and locked the cat litter box, and the cat litter box can be conveniently detached from the casing, so that the cat litter box can be conveniently cleaned.

To solve the above problems, the invention adopts the following technical scheme:

A cat litter box, which comprises:
The casing is a box structure with an open top, a gear drive mechanism is arranged on the side wall of the machine casing, and a collection bin for receiving cat feces and caked cat litter is arranged at the bottom of the machine casing;
A cat litter bin with a cavity structure and a cavity for accommodating cat litter, wherein the cat litter bin is located in the top opening of the casing and is correspondingly arranged above the collection bin;
The side wall of the casing is provided with a rotatable first rotating shaft corresponding to the first end of the cat litter bin, the first rotating shaft is provided with a first clamping part towards the first end of the cat litter bin, and the inner edge of the top opening of the casing is provided with a first opening corresponding to the first clamping part, and the first end of the cat litter bin is clamped at the first clamping part of the first rotating shaft;
A driving motor and a gear transmission mechanism arranged in the side wall of the casing, wherein the gear transmission mechanism is positioned above the side of the driving motor, the power input end of the gear transmission mechanism is connected with the output shaft of the driving motor, and the power output end of the gear transmission mechanism is arranged corresponding to and clamped with the second end of the cat litter bin;
When the driving motor drives the gear transmission mechanism to drive the cat litter bin to rotate until the first end of the cat litter bin is clamped with the first clamping part of the first rotating shaft corresponding to the first opening, the cat litter bin and the casing are in a separable unlocked state;
When the clamping position between the first end of the cat litter bin and the first clamping part of the first rotating shaft does not correspond to the first opening, the cat litter bin and the casing are in an inseparable mechanical locked state.

Optionally, the side wall of the casing is provided with a second rotating shaft corresponding to the second end of the cat litter bin, and the circumferential surface of the second rotating shaft facing the second end of the cat litter bin is provided with a second clamping part, and the inner edge of the top opening of the casing is provided with a second opening corresponding to the second clamping part, which is symmetrically arranged with the first opening with respect to the first axis section of the casing, and the second end of the cat litter bin is clamped with the second rotating shaft.

Optionally, the first end of the cat litter bin is provided with a first transverse strut, and the second end of the cat litter bin is provided with a second transverse strut;
The side wall of the upper half of the casing includes a hollow structure formed by connecting the inner and outer side walls at the top, and the inner side wall of the upper half of the casing is provided with a first mounting hole corresponding to the first rotating shaft, and the first rotating shaft passes through and is supported on the first mounting hole, and the first opening intersects with the first mounting hole downward along the inner edge of the top opening of the casing;
The inner side wall of the upper half of the casing is provided with a second mounting hole corresponding to the second rotating shaft, and the second rotating shaft passes through and is supported on the second mounting hole, and the second opening penetrates the second mounting hole downward along the inner edge of the top opening of the casing;
The first clamping part is a first open groove formed on the circumferential surface of the first end of the first rotating shaft, the second clamping part is a second open groove formed on the circumferential surface of the second end of the first rotating shaft, the first transverse strut is arranged in the first open groove, and the second transverse strut is arranged in the second open groove;
Among them, when the rotating shaft of the cat litter bin rotates to the position where the first open groove corresponds to the first opening and the second open groove corresponds to the second opening, the cat litter bin is in an unlocked state that can be separated and taken out from the casing; When the rotating shaft of the cat litter bin rotates to a position where the first open groove does not correspond to the first opening and the second open groove does not correspond to the second opening, the cat litter bin and the casing are in a mechanical locked state that cannot be separated and taken out.

Optionally, one side of the cavity of the cat litter bin along the direction of the rotating shaft of the cat litter bin is provided with a cat litter separation grid, which is supported in the cavity and has a plurality of evenly arranged grid bars, and intervals forming grid holes are arranged between adjacent grid bars, and the grid holes are configured to block and separate cat litter solid foreign matters with predetermined granularity.

Optionally, a control mainboard is arranged on the casing, and a Hall sensor is arranged on the inner wall of the casing near the top, which is within the rotation path range of the cat litter bin, and the Hall sensor is electrically connected with the control mainboard and configured to inductively detect the rotation position of the cat litter bin.

Optionally, a motion sensor is also arranged on the inner wall of the casing near the top, and the sensing element of the motion sensor faces the external area environment opposite to the opening of the cat litter bin. The motion sensor is electrically connected with the control mainboard and is configured to detect whether there is a moving object near the opening of the cat litter bin in the external area environment and feed it back to the control mainboard.

Optionally, the collection bin includes a bottom plate and a side wall extending upward around the bottom plate, and an infrared sensor is arranged on the side wall of the collection bin, which is electrically connected with the control mainboard, and the probe of the infrared sensor is arranged towards the inside of the collection bin, and is configured to detect whether the deposit in the collection bin reaches a predetermined height.

Optionally, a living creature radar is also arranged on the inner wall of the casing near the top, and the probe of the living creature radar is arranged towards the inside of the cat litter bin, and is configured to detect whether there is an object with vital signs in the cat litter bin.

Optionally, the bottom of the casing is respectively provided with weighing sensors near the four corners, and the weighing sensors are electrically connected with the control mainboard, wherein at least two weighing sensors are arranged on the same side as the live radar and are configured to cooperate with the live radar to detect whether an object with vital signs enters the litter box.

Optionally, the bottom in the casing is also provided with an open groove, an aromatherapy box is embedded in the open groove, and the aromatherapy box is configured to place aromatherapy;

One side of the aromatherapy box close to the cat litter bin is provided with an air inlet, and one side of the aromatherapy box facing the lateral collection bin is provided with an air outlet. An axial fan is arranged in the interior of the casing at the position corresponding to the air inlet, and the axial fan is configured to suck external air into the aromatherapy box and blow it into the collection bin through the air outlet.

Optionally, the axis of the rotating shaft formed by the center connection of the two end faces of the cat litter bin is arranged on the vertical center surface of the cavity of the cat litter bin.

Compared with the current technology, the technical scheme of the invention has the following advantages:

According to the cat litter box provided by the embodiment of the invention, the casing is set as a box structure with an open top, and an open structure design is adopted; the cat litter bin is placed in the top opening of the casing, so that the open structure at the top of the casing provides a convenient operating space for users; and the cat litter bin is connected with the gear drive mechanism in the casing, so that the cat litter bin can be switched between a locked state and an unlocked state under the drive of the gear drive mechanism, and when it needs to be disassembled for cleaning, Only under the drive of the driving motor, the cat litter bin is driven to rotate until the opening of the first open groove corresponds to the first opening and the second open groove corresponds to the second opening, so that the cat litter bin 120 and the casing are in a separable unlocked state; In an unlocked state, because that first opening correspond to the first clamping part is arranged, when the cat litter bin is pulled out from the clamping part of the first clamping part, the freedom of the path in the pulling direction is not limited, that is, there is no object blocked the pulling out of the first end of the cat litter bin, so that the cat litter bin can be conveniently taken out of the casing without using an additional disassembly tool, and the convenient disassembly and removal of the cat litter bin is realized, so that the operation difficulty is reduced, thereby being convenient for replacement or cleaning.

BRIEF DESCRIPTION OF THE DRAWINGS

To clearly explain the embodiments of the present application or the technical scheme in the current technology, the drawings needed in the description of the embodiments or the current technology will be briefly introduced below. Obviously, the drawings in the following description are only some of the embodiments recorded in the present application, and other drawings can be obtained according to these drawings without creative work for ordinary people in the field.

DETAILED DESCRIPTION OF THE EMBODIMENT'S

To make people in the technical field better understand the scheme of the application, the technical scheme in the embodiment of the application will be described clearly and completely with the attached drawings. Obviously, the described embodiment is only a part of the embodiment of the application, but not the whole embodiment. Based on the embodiments in this application, all other embodiments obtained by ordinary technicians in this field without creative work belong to the protection scope of this application.

Figure 1:
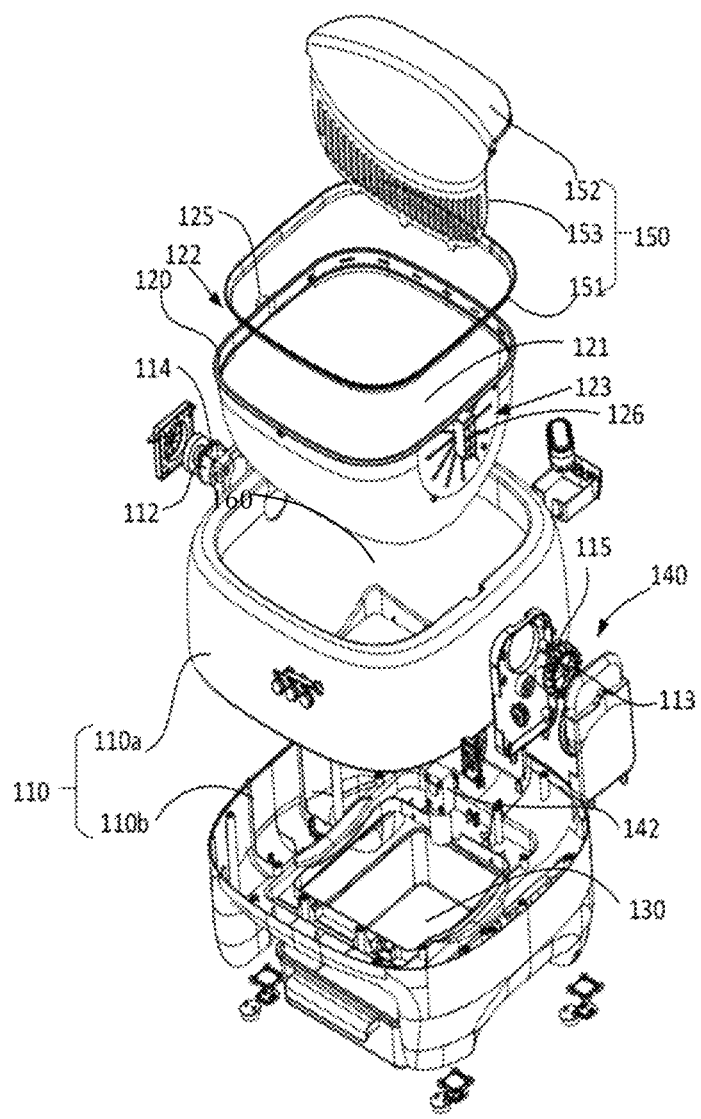
FIG. 1 is a schematic diagram of an exploded structure of a cat litter box provided according to some embodiments of the present invention.
Figure 2:
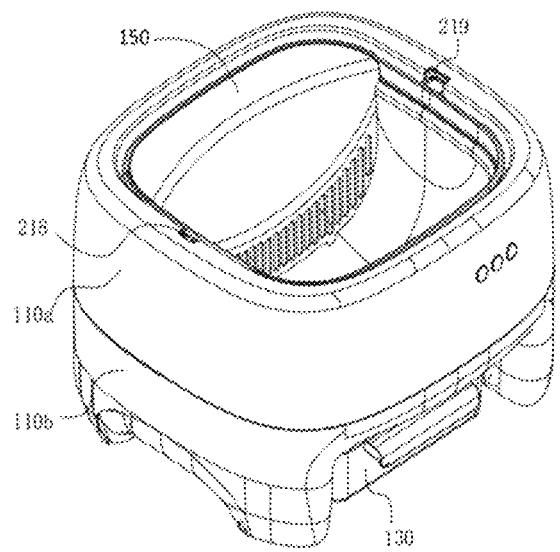
FIG. 2 is a schematic view of the overall structure of a cat litter box provided according to some embodiments of the present invention.

Referring to FIG. 1 and FIG. 2, the litter box provided by the embodiment of the present application includes a casing 110, a litter bin 120, a collection bin 130, a driving motor 142 and a gear transmission mechanism 140.

Among them, the casing 110 is a box structure with an open top, and the open structure including the upper casing 110a and the lower casing 110b is easier to cooperate with the arrangement structure of the cat litter bin described below, which is convenient for taking out the cat litter bin.

In some embodiments, a gear transmission mechanism 140 is arranged on the side wall thereof to drive the cat litter bin 120 to rotate; The bottom of the casing is provided with a collection bin 130 for receiving cat feces and caked cat litter. Preferably, the collection bin is detachably installed at the bottom of the cabinet 110, so that users can disassemble it periodically for cleaning. In some embodiments, the collection bin 130 can be fixed at the bottom of the cabinet 110 by pressing the buckle device. When the cat litter lumps fall into the collection bin 130, the user can loosen the buckle and directly pull out the collection bin 130 for cleaning.

The cat litter bin 120 is of a cavity structure. In some embodiments, the cat litter bin 120 has a roughly hemispherical cavity. Of course, it can also be designed with an approximately spherical or approximately hemispherical structure. Due to the symmetry of the cavity with a hemispherical structure, when the gear drive mechanism applies torque to the cat litter bin 120 through rotation, the torque transmitted to the cat litter bin can be effectively dispersed, so that the cat litter bin with a hemispherical or spherical structure can bear the applied torque more evenly. Therefore, with the cooperation of the gear drive mechanism, the rotating torque is increased, and the instability caused by mechanical friction or uneven stress is reduced at the same time, so that the load change of the cat litter bin during work can be well borne, and the risk of structural damage can be reduced to a certain extent, especially when dealing with a large amount of cat litter.

The interior of the cat litter bin 120 is provided with a cavity 121 for accommodating cat litter, and the cat litter bin 120 is located in the top opening of the cabinet 110 and is correspondingly arranged above the collection bin 130; In some embodiments, the first end 122 of the litter bin 120 is rotatably connected to the side wall of the casing 110, and the second end 123 is in transmission connection with the gear transmission mechanism 140.

It should be noted that the connection in this paper can be a direct connection between two features, or an indirect connection between one feature and another through an intervening third feature. For embodiment, the first end 122 of the cat litter bin 120 can be rotatably connected to the side wall of the cabinet 110, which can include that the first end 122 of the cat litter bin 120 can be directly and rotatably connected to the side wall of the cabinet 110, or it can be rotatably connected to the side wall of the cabinet 110 through an intervening rotating shaft. The embodiments given here are only for understanding, not as specific limitations.

Specifically, a rotatable first rotating shaft 112 is arranged in the side wall of the casing 110 corresponding to the first end of the cat litter bin 120, and the first rotating shaft 112 is provided with a first engaging part 114 toward the first end of the cat litter bin 120, and the inner edge of the top opening of the casing 110 is provided with a first opening 218 corresponding to the first engaging part 114, and the first end of the cat litter bin 120 is engaged with the first rotating shaft.

A driving motor 142 and a gear transmission mechanism 141 arranged in the side wall of the casing 110, wherein the gear transmission mechanism 141 is located above the side of the driving motor 142, the power input end of the gear transmission mechanism 141 is connected to the transmission shaft of the driving motor 142, and the power output end of the gear transmission mechanism 141 is arranged corresponding to and clamped with the second end of the cat litter bin 120;

The driving motor 142 drives the gear transmission mechanism 141 to drive the cat litter bin 120 to rotate until the first end of the cat litter bin 120 is clamped with the first clamping part 114 of the first rotating shaft corresponding to the first opening 218, so that the cat litter bin 120 and the casing 110 are in a separable unlocked state; In that unlocked state, because the first opening 218 correspond to the clamping part of the first clamping part 114 is arranged, when the cat litter bin 120 is pul out from the clamping part of the first clamping part 114, the freedom in the path of the pulling-out direction is not limited, that is, there is no object blocked the pulling-out of the first end of the cat litter bin, so that the cat litter bin 120 can be conveniently taken out of the cabinet 110 without using an additional disassembly tool, so as to facilitate replacement or cleaning of the cat litter bin.

In some embodiments, when the cat litter bin 120 is configured to rotate to the position where the first end of the cat litter bin 120 is clamped with the first clamping part 114 of the first rotating shaft corresponding to the first opening 218, the opening surface of the cat litter bin 120 is configured to be in the same direction as the top opening direction of the cabinet 110, that is, when the cat litter bin 120 is coplanar or planar in space, the cat litter bin 120 is configured to be in an unlocked state that can be taken out of the cabinet.

Of course, in other embodiments, the cat litter bin 120 can also be configured such that when the first end of the cat litter bin 120 engages with the first engaging part 114 of the first rotating shaft to correspond to the first opening 218, the opening surface of the cat litter bin 120 is different from the top opening direction of the casing 110.

When the first end of the cat litter bin 120 and the first engaging part of the first rotating shaft do not correspond to the first opening 218, the cat litter bin 120 and the casing 110 are in an inseparable mechanical locked state. The cat litter bin 120 is in a locked state. At this time, the cat litter bin 120 is fixed in the casing 110 and will not be displaced due to external force, thus ensuring the safety and stability when in use.

In some embodiments, the main idea of the above-mentioned specific structure for realizing the locked and unlocked state is that the paths taken by both ends of the cat litter bin 120 from the casing are not blocked by the constituent structures on the casing and other bodies, that is, the freedom of the cat litter bin 120 in the outward moving direction is not limited; When the cat litter bin is in working state, it is necessary to ensure the reliability of fixing the cat litter bin in the casing. At this time, the paths taken out of the casing by both ends of the cat litter bin need to be blocked to limit the freedom of its outward movement direction, thus ensuring its working reliability.

In the aforementioned embodiment, the specific structure of the second end of the cat litter bin is not limited. Based on the above concept, with reference to FIG. 1, in some specific structural implementations, a second rotating shaft 113 is provided on the side wall of the casing 110 corresponding to the second end of the cat litter bin 120, and a second clamping part 115 is provided on the circumferential surface of the second rotating shaft 113 facing the second end of the cat litter bin 120. And the inner edge of the top opening of the casing 110 is provided with a second opening 219 corresponding to the second clamping part 115. The second opening 219 and the first opening are symmetrically arranged with respect to the first axial section of the casing 110. The second end of the cat litter bin 120 is clamped on the second clamping part 115 of the second rotating shaft 113, and the other end of the second rotating shaft 113 is connected to the power output end of the gear transmission mechanism.

Referring to FIG. 1, in some embodiments, the first end 122 of the litter bin 120 is provided with a first transverse strut 125, and the second end 123 is provided with a second transverse strut 126; The sidewall of the upper half of the casing 110 includes a hollow structure formed by connecting the inner and outer sidewalls at the top. The inner sidewall of the upper half of the casing 110 is provided with a first mounting hole 162 corresponding to the first rotating shaft. The first rotating shaft passes through and is supported on the first mounting hole 162, and the first opening 218 intersects with the first mounting hole 162 downward along the inner edge of the top opening of the casing 110.

The inner side wall of the upper half of the casing 110 is provided with a second mounting hole 163 corresponding to the second rotating shaft 113, the second rotating shaft 113 passes through and is supported on the second mounting hole 163, and the second opening intersects with the second mounting hole 163 downward along the inner edge of the top opening of the casing 110;

The first clamping part 114 (hereinafter, the first open groove is also marked with 114) is a first open groove formed on the circumferential surface of the first end of the first rotating shaft, and the second clamping part 115 (hereinafter, the second open groove is also marked with 115) is a second open groove formed on the circumferential surface of the second end of the first rotating shaft, and the first transverse strut is arranged on the first open groove.

When the rotating shaft of the cat litter bin rotates to the position where the first open groove 114 corresponds to the first opening 218 and the second open groove 115 corresponds to the second opening 219, the cat litter bin is in an unlocked state that can be separated and taken out from the casing.

When the rotating shaft of the cat litter bin rotates to a position where the first open groove 114 does not correspond to the first opening 218, and the second open groove 115 does not correspond to the second opening 219, the cat litter bin and the casing are in a mechanical locked state that cannot be separated and taken out.

In some embodiments, the first transverse strut 125 is inserted into the first rotating shaft 112 of the side wall of the casing 110, and the second transverse strut 126 is inserted into the second rotating shaft 113. The circumferential surface of one end of the first rotating shaft 112 facing the cat litter bin 120 is provided with a first open groove 114, and the circumferential surface of one end of the second rotating shaft 113 facing the cat litter bin 120 is provided with a second open groove 115. The first open groove 114 and the second open groove 115 are open grooves, respectively. The first transverse strut 125 is arranged in the first open groove 114 and the second transverse strut 126 is arranged in the second open groove 115, which should be able to accommodate the first transverse strut 125 and the second transverse strut 126 of the cat litter bin 120 respectively.

When the opening surface of the cat litter bin 120 is the same as the opening direction of the top of the cabinet 110, the opening ends of the first open groove 114 and the second open groove 115 are upward. At this time, the first transverse strut 125 and the second transverse strut 126 can be taken out in the direction of the open groove, and the cat litter bin 120 is in an unlocked state, which is convenient for users to disassemble. When the opening face of the cat litter bin 120 is different from the opening direction of the top of the cabinet 110, the side walls of the first open groove 114 and the second open groove 115 are located in the take-out direction of the first transverse pillar 125 and the second transverse pillar 126, thus limiting the upward movement of the transverse pillar, and the cat litter bin 120 is locked, thus ensuring the use safety of the litter box.

In some embodiments, the notches of the first open groove 114 and the second open groove 115 may be provided with a certain slope or arc-shaped edge to help the first transverse strut 125 and the second transverse strut 126 to be inserted into the grooves more easily, so that the disassembly is smoother. In addition, the depth of the open groove should be deep enough, generally between 5 mm and 15 mm, to ensure that the first transverse strut 125 and the second transverse strut 126 can be firmly embedded and provide a stable locked effect.

According to the need of easy installation, the width of the open groove can be set slightly larger than the outer diameter of the transverse strut, for embodiment, it can be set to a tolerance range of 1-2 mm to ensure smooth fit and firm clamping during installation. Of course, in order to improve the firmness in the locked state at work, an appropriate interference fit can be adopted for the matching between the transverse strut of the cat litter bin and the open groove, but the interference amount can be between 0.05 mm and 0.2 mm to avoid the cat litter bin becoming more difficult to install.

The material selection of the first rotating shaft 112 and the second rotating shaft 113 should have sufficient strength to withstand the torque generated by the cat litter bin during rotation or operation. For embodiment, engineering plastics, such as ABS or PC, or metal materials, such as aluminum alloy and light steel, can be selected to ensure strength and durability.

Figure 3:
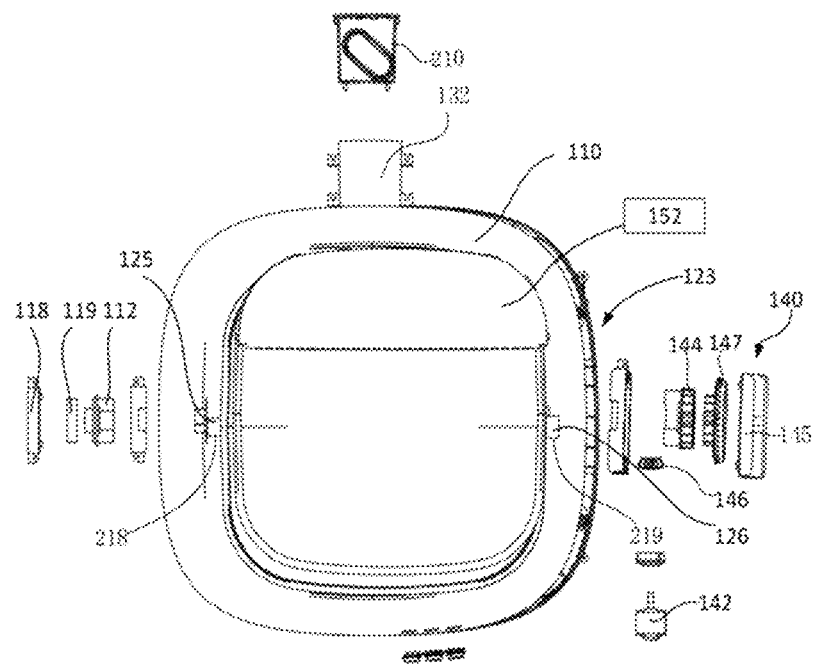
FIG. 3 is a schematic diagram of an exploded structure of a cat litter box provided according to some embodiments of the present invention.

In order to make the cat litter bin rotate smoothly, referring to FIG. 3, in some embodiments, a bearing seat 118 is arranged in the casing near the side wall, and a bearing 119 is installed in the bearing seat, and the first rotating shaft 112 is rotatably connected to the bearing 119.

The ends of the first transverse strut 125 and the second transverse strut 126 can be designed with rounded corners or oblique angles, so as to be smoother and reduce wear when being inserted into the corresponding open grooves; In some embodiments, the surfaces of the first transverse strut 125 and the second transverse strut 126 can be slightly increased in surface roughness by sandblasting or plating, which is helpful to increase the friction with the open groove and enhance the locked effect.

Of course, based on the aforementioned technical concept of realizing the unlocked and locked state of the cat litter bin, in some embodiments, the first end of the cat litter bin 120 can also be provided with an open groove structure, and the circumferential surfaces of the first rotating shaft and the second rotating shaft are provided with a suitable limit projection structure, so that the unlocked and locked state of the cat litter bin relative to the casing can also be realized.

Figure 4:
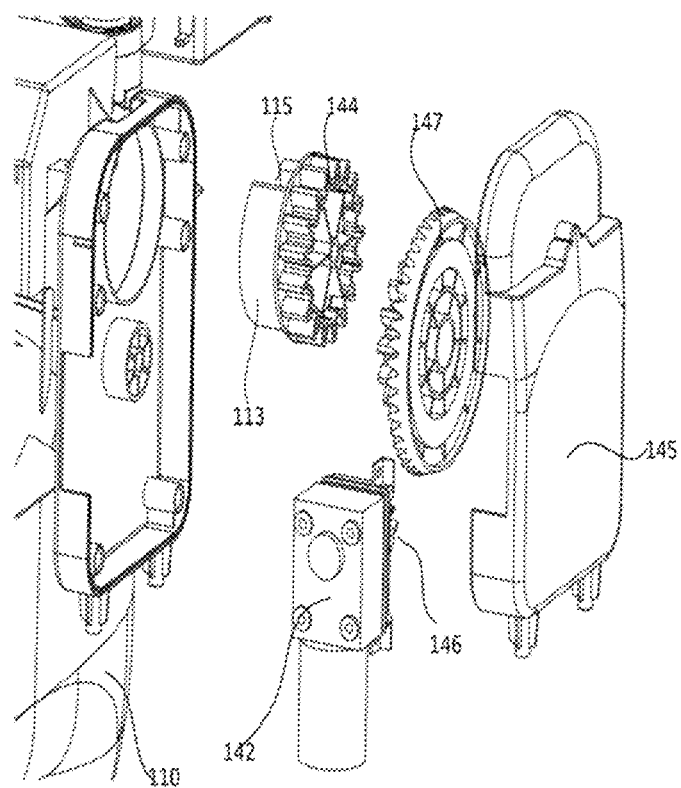
FIG. 4 is an exploded schematic view of a driving motor and a gear transmission mechanism provided according to some embodiments of the present invention.
Figure 5:
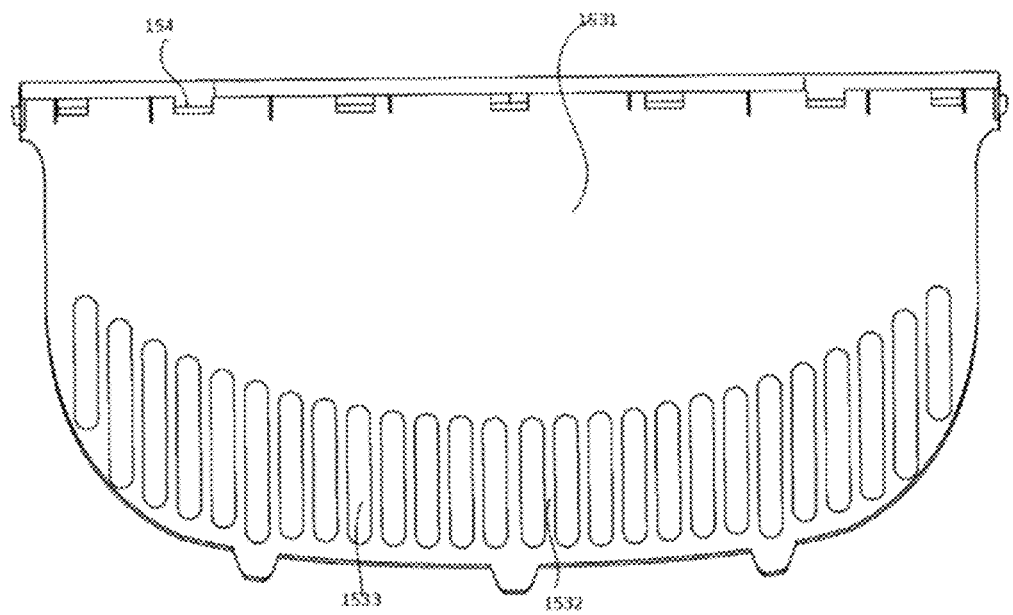
FIG. 5 is a front view of a cat litter separation grid provided according to some embodiments of the present invention.
Figure 6:
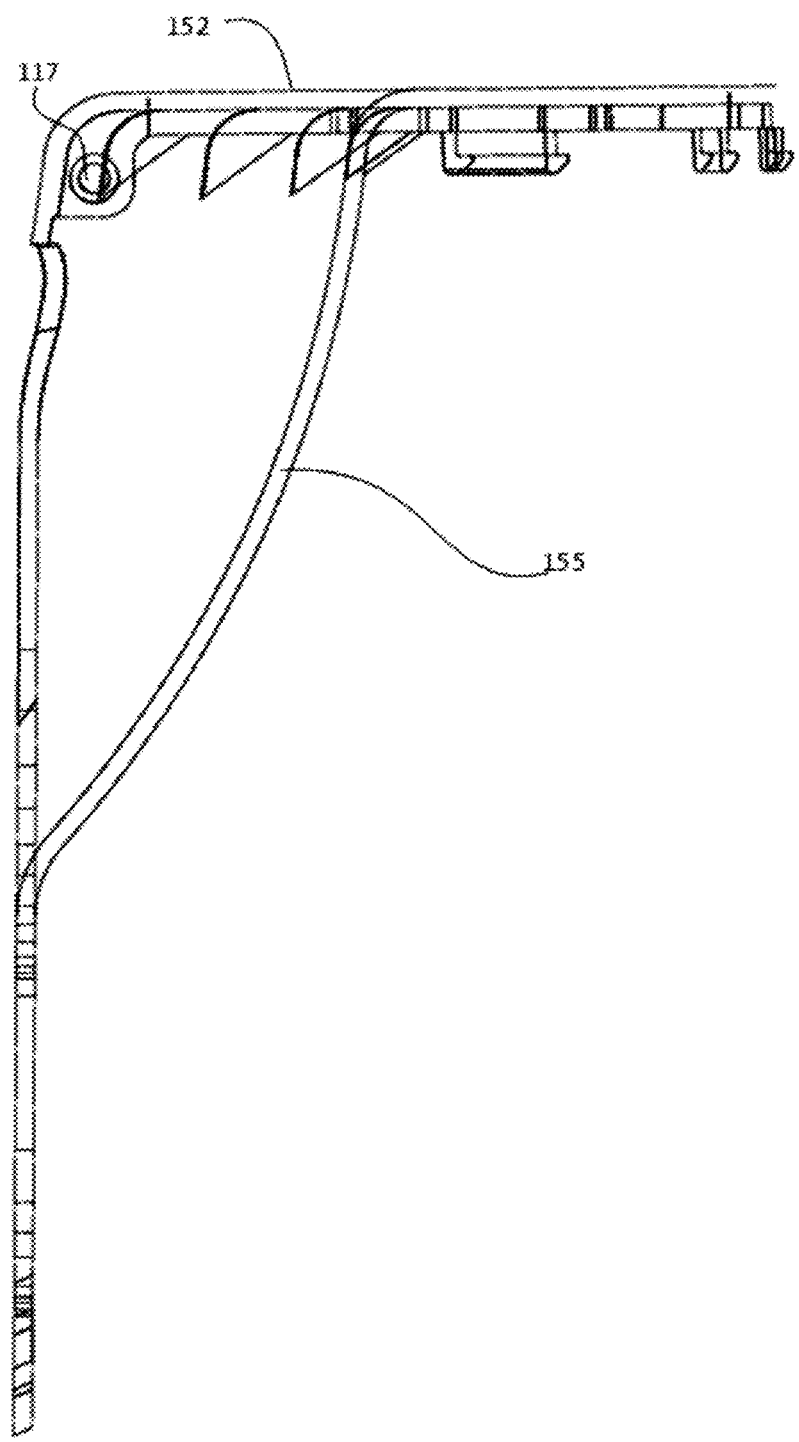
FIG. 6 is a side view of a cat litter separation grid provided according to some embodiments of the present invention.

Referring to FIG. 4, in some embodiments, the gear transmission mechanism 140 includes a reduction gear set and a spur gear 144; The reduction gear set comprises a gear mounting casing 145 connected to the side wall of the upper half of the casing, a bevel gear 146 and a differential gear 147 located in the gear mounting casing 145, wherein the driving motor 142 is correspondingly arranged at the side of the bevel gear 146, the axle of the bevel gear 146 is connected to the output shaft of the driving motor 142, and the driving motor 142 can be a DC motor; The differential gear 147 includes a high-speed input end and a low-speed output end. The bevel gear 146 meshes with the high-speed input end of the differential gear 147, and the low-speed output end of the differential gear 147 meshes with the teeth of the spur gear 144, which is connected with the end of the second rotating shaft facing away from the cat litter bin in the axial direction.

Please refer to FIG. 4. In some embodiments, the second rotating shaft 115 is integrally formed with the spur gear 144, or the second rotating shaft 115 is fixedly connected to one end of the spur gear 144 in the axial direction.

Continuing to refer to FIG. 1 to FIG. 4, in some embodiments, the casing includes an upper casing 110a and a lower casing 110b butted with the upper casing 110a, and a gear mounting casing 145 is supported and arranged on the lower casing of the casing. The high rotational speed provided by the driving motor 142 is transmitted to a differential gear 147 through a bevel gear 146, and the low-speed output end of the differential gear 147 meshes with a spur gear 144. The driving signal is transmitted to the spur gear 144, which is connected with the second rotating shaft of the cat litter bin, and the spur gear 144 drives the second rotating shaft to rotate in the axial direction, thereby driving the cat litter bin to rotate. In this embodiment, due to the adoption of the reduction gear set, the rotating speed of the cat litter bin is relatively low, which is helpful to reduce the vibration of the cat litter bin during use and ensure the stability and high efficiency of cat litter cleaning.

Please refer to FIG. 1, FIG. 2, FIG. 5 and FIG. 6. In some embodiments, a cat litter separation grid 150 is arranged in the cavity of the cat litter bin 120 along the direction of the rotating shaft of the cat litter bin 120. The cat litter separation grid 150 is supported in the cavity 121 and has a plurality of evenly arranged grid bars 1532, and intervals for forming grid holes 1533 are arranged between adjacent grid bars 1532. The size of the grid hole 1533 is accurately designed according to the particle size of the cat litter to be filtered. For embodiment, the size of the grid hole 1533 is 2 mm to 5 mm; The grid hole 1533 is configured to block and separate cat litter solid foreign matter (cat litter caked with feces or other liquids) with a predetermined granularity.

In this embodiment, when the cat litter bin rotates, the cat litter separation grid 150 can screen and isolate larger cat litter solid foreign matter, which is helpful to improve the utilization rate and cleanliness of cat litter and avoid unnecessary waste. The material of the grating 1532 can be high-strength plastic or metal to ensure good wear resistance and corrosion resistance in long-term use.

During operation, when the cat litter bin 120 rotates, the contact surface between the cat litter separation grid 150 and the cat litter continuously rubs, and the generated friction helps to separate larger solid foreign matters, and smaller cat litter particles fall into the collection bin through the grid holes 1533, thus keeping the cat litter inside the cat litter bin clean and recycled.

Figure 8:
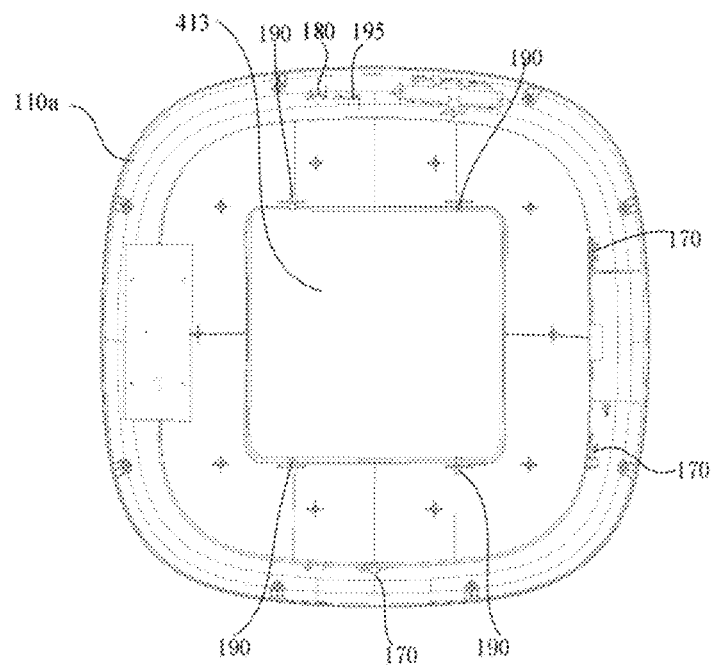
FIG. 8 is a top view of an upper casing provided according to some embodiments of the present invention.

Referring to FIG. 1 and FIG. 8, in some embodiments, a control mainboard 160 is arranged on the cabinet 110, and a Hall sensor 170 is arranged on the inner wall of the cabinet 110 near the top and within the rotation path of the cat litter bin 120. The Hall sensor 170 is configured to be electrically connected with the control mainboard 160 and configured to inductively detect the rotation position of the cat litter bin 120.

In this embodiment, there is a control mainboard 160 in the casing, which is used to control the operation of the whole litter box, including the start and stop of the driving motor 142, the rotation speed of the litter box 120, the signal processing of the sensor and other functions. The control mainboard 160 is electrically connected with the Hall sensor 170. The Hall sensor 170 is located on the inner wall of the casing, close to the top of the cat litter bin, so as to ensure that the rotating state of the cat litter bin can be sensed in real time.

Specifically, when the cat litter bin 120 rotates, the Hall sensor 170 uses the principle of magnetic field induction to monitor its rotating position, and transmits the signal to the control mainboard 160, and the control mainboard 160 judges the current position of the cat litter bin 120 according to the rotating data fed back by the Hall sensor 170, thus realizing accurate control of the cat litter bin, improving the automation level of the cat litter bin and ensuring the accuracy and efficiency of the cat litter cleaning process.

It can be understood that the Hall sensor 170, the control mainboard 160 and other sensors in this paper are all mature technologies at present, and some existing products can be selected as needed. The development and implantation of the control program corresponding to the control mainboard 160 can be easily realized by those skilled in the art. In order to show that the innovative theme of this application mainly lies in structural improvement, the procedural implementation methods of the control mainboard 160 are not described in detail.

Continuing to refer to FIG. 8, in some embodiments, a motion sensor 180 is further arranged on the inner wall of the cabinet 110 near the top, and the sensing element of the motion sensor 180 faces the external area environment opposite to the opening of the cat litter bin. The motion sensor 180 is electrically connected with the control mainboard 160 and is configured to detect whether there is a moving object near the opening of the cat litter bin 120 in the external area environment and feed it back to the control mainboard 160.

Specifically, the motion sensor 180 is fixedly installed at the top position of the inner wall of the cabinet 110, and is firmly fixed by means of screws or pasting. The sensing element of the motion sensor 180 faces the external environment opposite to the opening of the cat litter bin, so as to monitor the dynamic changes in the external environment in real time. Among them, the motion sensor 180 can adopt infrared, radar and other microwave sensing technologies, and its sensing distance can be set to 0.5 m to 1 m as needed to ensure that it can cover the main activity area in front of the opening of the cat litter box. When there is a moving object near the opening of the litter bin in the external environment, the motion sensor 180 will trigger a signal and feed back the detection result to the control mainboard 160. The control mainboard 160 can adjust the running state of the litter box according to the feedback information, for embodiment, pause the rotation of the litter box or give a prompt sound to avoid possible misoperation or danger.

The collecting bin 130 includes a bottom plate 131 and a side wall extending upward around the bottom plate 131. An infrared sensor 190 is arranged on the side wall of the collecting bin 130, and the collecting bin 130 is arranged corresponding to the discharging opening 413 of the cat litter bin. The infrared sensor 190 is electrically connected with the control mainboard 160, and the probe of the infrared sensor 190 is arranged towards the inside of the collection bin 130, and is configured to detect whether the product in the collection bin 130 reaches a predetermined height.

Specifically, the collection bin 130 is composed of a bottom plate 131 and a side wall, wherein the bottom plate 131 is used for bearing the separated cat litter, and the side wall is formed by extending upward along the bottom plate 131, and the space surrounded by the side wall is used for containing the separated product; the infrared sensor 190 can be fixedly installed at the middle and upper position of the side wall of the collection bin 130, and the probe faces the inside of the collection bin 130 and is connected to the control mainboard 160 through a cable; The infrared sensor 190 judges the height of the product in the collection bin 130 by emitting and receiving infrared rays. When the product height reaches a preset value, the infrared sensor 190 will send a signal to the control mainboard 160, and the control mainboard 160 will trigger an indication signal accordingly to remind the user to clean the collection bin 130, so as to realize the monitoring of the product height together with the control mainboard 160 and avoid the normal operation of the cat litter box being affected by excessive product.

In some embodiments, a living creature radar 195 is also arranged on the inner wall of the casing 110 near the top, and the probe of the living creature radar 195 is arranged towards the inside of the cat litter bin, so that the detection range of the living creature radar 195 can basically cover the internal area of the cat litter bin, and it is configured to detect whether there are objects with vital signs in the cat litter bin.

Specifically, the live radar 195 is installed at the inner wall of the top of the cabinet 110, and the radar probe faces the inside of the cat litter bin. The live radar 195 can detect whether there are objects with vital signs, such as moving cats, inside the cat litter bin by using microwave Doppler induction technology. The live radar 195 is connected with the control mainboard 160 through a cable. When an object with vital signs is detected in the cat litter bin, the radar will send a signal to the control mainboard 160. According to the signal, the control mainboard 160 judges whether the cat litter bin is in an occupied state, so as to determine whether to suspend the cleaning or rotating operation of the cat litter bin, so as to avoid injury to pets.

In some embodiments, the bottom of the cabinet 110 is respectively provided with weighing sensors 200 near the four corners, each weighing sensor 200 is connected with the bottom of the cabinet 110 through a fixed bracket, and the overall weight change of the cat litter box is detected by the uniformly distributed weighing sensors 200, so as to avoid misjudgment caused by single point error; The weighing sensors 200 are electrically connected with the control mainboard 160, wherein at least two weighing sensors 200 are arranged on the same side as the live radar 195 and are configured to cooperate with the live radar 195 to detect whether an object with vital signs enters the litter box.

When a pet enters the litter box, the weighing sensor 200 will detect the weight change at the bottom of the cabinet 110, and transmit this information to the control mainboard 160, which will be combined with the signal detected by the live radar 195 to provide additional judgment basis on the basis of the detection by the live radar 195, so as to more accurately confirm whether an object with vital signs enters the litter box.

Figure 7:
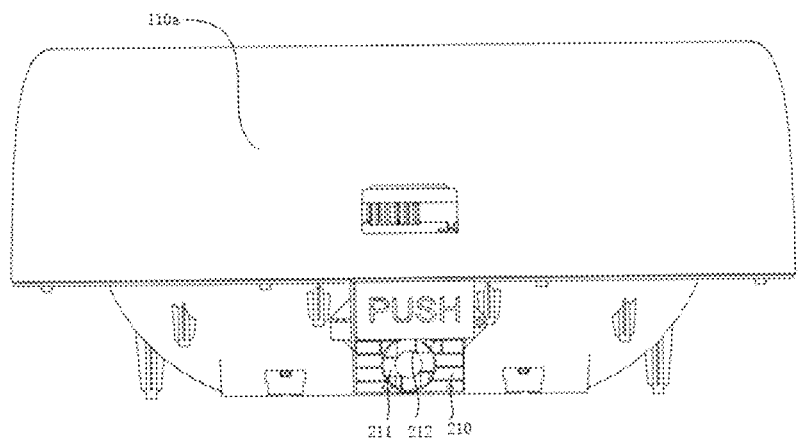
FIG. 7 is a rear view of a litter box provided according to some embodiments of the present invention.

Referring to FIG. 3 and FIG. 7, in some embodiments, the sidewall of the bottom of the cabinet 110 is further provided with an open groove 132, which penetrates into the interior of the cabinet 110, and an aromatherapy box 210 is embedded in the open groove 132, which is configured to place aromatherapy; One side of the aromatherapy box 210 facing the collection bin 130 at the bottom of the casing 110 is provided with a vent hole 211, and an axial fan 212 is arranged in the casing 110 at a position corresponding to the vent hole 211, and the axial fan 212 is configured to blow the fragrance emitted in the aromatherapy box 210 into the collection bin 130 through the vent hole 211.

In some embodiments, the open groove 132 is arranged in the lower casing for embedding the aromatherapy box 210, and the outer wall of the aromatherapy box 210 is closely matched with the inner wall of the open groove 132 to ensure its stability. The inside of the aromatherapy box 210 is a cavity structure for accommodating different kinds of aromatherapy, such as aromatic particles or essential oil pieces.

The axial fan 212 is installed in the cabinet 110 and is electrically connected with the control mainboard 160. The axial fan 212 receives control signals through wires, generates airflow during operation, and pumps the fragrance emitted from the aromatherapy box 210 to the collection bin 130, thus improving the odor environment inside the cat litter box.

In some embodiments, the cat litter bin 120 is an integrally formed cavity, and the axis of the rotating shaft formed by connecting the centers of the two end faces of the cat litter bin is located on the vertical center surface of the cavity 121 of the cat litter bin 120.

Specifically, the center line connecting the first lateral support shaft 125 and the second lateral support shaft 126 at both ends of the cat litter bin 120 forms the axis of rotation. When the cat litter bin 120 rotates around the axis of rotation, the axis of rotation coincides with the vertical center plane of the cavity of the cat litter bin 120, so as to ensure that the cat litter bin does not deviate during the rotation.

The rotation angle of the cat litter bin 120 is 25°-75°, so as to ensure that the cat litter can be fully rolled without overflowing the cat litter or affecting the separation effect due to excessive rotation.

When the rotation angle is set to 25°, it is mainly used for turning cat litter slightly, which is suitable for daily cleaning mode; When the rotation angle is increased to 75°, the cat litter can be turned over in a large range, which is suitable for deep cleaning mode; The control mainboard 160 can adjust the rotation angle according to the usage of cat litter set or detected by the user to meet different cleaning requirements.

Referring to FIGS. 1, 3, 5 and 6, in some embodiments, the cat litter separation grid 150 includes a support bracket 151, a suspension plate 152 and a separation grid plate 153, wherein the support bracket 151 is buckled on the opening edge of the cat litter bin 120, and three edges of the suspension plate 152 are clamped on the support bracket 151 through buckles 154. The end of one edge of the suspension plate 152 is provided with a connecting part 117, and the separation grid plate 153 has a concave arc-shaped belt structure, and both ends of the separation grid plate 153 are vertically hung and connected to the connecting part 117.

Specifically, the separation grid plate 153 includes a slope surface 1531 with curvature extending downward from the top, which is beneficial to the flow of cat litter. And a plurality of grid bars 1532 extending downward from the bottom of the slope surface 1531 and arranged side by side at intervals, and grid holes 1533 are formed at intervals between adjacent grid bars 1532, and the width of the grid holes 1533 is designed to be 2-5 mm.

In this embodiment, the supporting bracket 151 is an integrally formed frame structure, and its external dimension 10 is matched with the opening edge of the cat litter bin, and the inner wall of the bracket is provided with a fastening groove to be firmly connected with the opening edge of the cat litter bin. The supporting bracket 151 can be made of high-strength engineering plastic, which can not only provide sufficient supporting strength, but also effectively reduce the structural weight.

The suspension plate 152 is a flat plate structure, and its three edges are fixedly connected with the corresponding positions of the support bracket 151 through open grooves, and the width and depth of the open grooves should ensure firm clamping and convenient installation and operation. The suspension plate 152 is made of the same material as the support bracket 151, and its surface is smoothed.

In addition, the structure of the separation grid plate 153 in this embodiment is beneficial for the cat litter to slide down along the surface of the grid bar 1532 during the rotation process, and the solid foreign matter can slide down to the bottom of the cat litter bin under the action of gravity, so as to realize effective separation.

Embodiment 2

Figure 9:
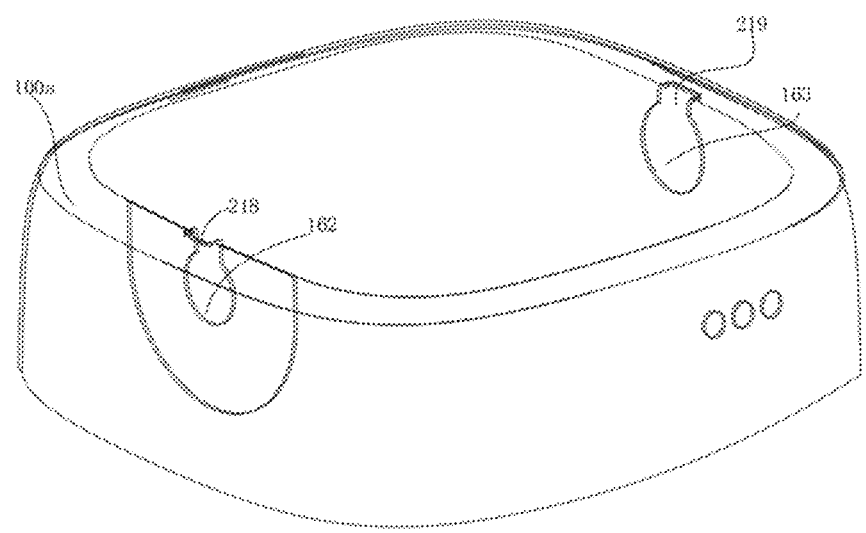
FIG. 9 is a schematic structural view of an upper casing with partial perspective effect provided according to some embodiments of the present invention.
Figure 10:
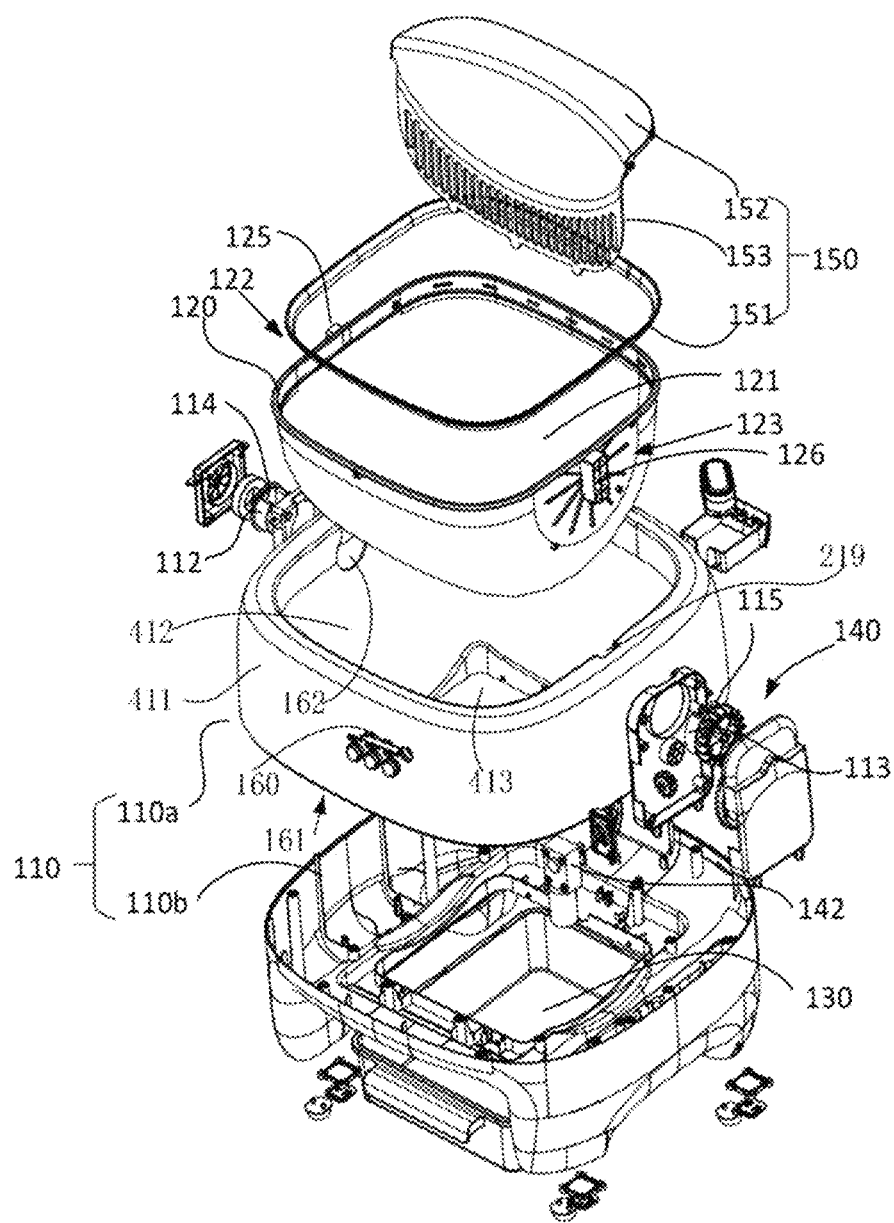
FIG. 10 is a schematic diagram of the exploded structure of the litter box provided according to the second embodiment of the present invention.

Referring to FIG. 2, FIG. 9 and FIG. 10, another embodiment of the present application provides a litter box, which includes an upper casing 110a, which includes an outer sidewall 411 and an outer sidewall 412 with an opening at the top, a hollow space 161 is provided between the outer sidewall 411 and the outer sidewall 412, and a through blanking hole 413 is provided at the bottom of the outer sidewall 412;

The lower casing 110b is connected with the bottom of the outer side wall 411 of the upper casing 110a, and the bottom of the lower casing is provided with a collection bin 130 for receiving cat feces and caked cat litter up and down corresponding to the blanking port 413;

The cat litter bin 120 is an open cavity structure, located in the top opening of the outer side wall 412 of the upper casing, and above the blanking port 413 at the bottom of the outer side wall 412, and has a cavity for accommodating cat litter inside;

The first end of the cat litter bin 120 is provided with a first transverse strut 125, and the second end of the cat litter bin 120 is provided with a second transverse strut 126;

The hollow space 161 between the outer side wall 411 and the outer side wall 412 of the upper casing is provided with a rotatable first rotating shaft 112 corresponding to the first end of the cat litter bin 120, and the circumferential surface of the first rotating shaft 112 facing the first end of the cat litter bin 120 is provided with a first open groove 114, and the inner edge of the top opening of the upper casing is provided with a first opening 218 corresponding to the first open groove 114.

And a driving motor 142 and a gear transmission mechanism 140 arranged in a hollow space 161 between the outer side wall 411 and the outer side wall 412 of the upper casing, wherein the gear transmission mechanism 140 is located above the side of the driving motor 142, and the power input end of the gear transmission mechanism 140 is connected to the output shaft of the driving motor 142, The power output end of the gear transmission mechanism 140 is arranged corresponding to the second end of the cat litter bin 120, and is clamped with the second transverse strut 126 at the second end of the cat litter bin 120;

The hollow space 161 between the outer side wall 411 and the outer side wall 412 of the upper casing is provided with a second rotating shaft 113 corresponding to the second end of the cat litter bin 120, and the circumferential surface of the second rotating shaft 113 facing the second end of the cat litter bin 120 is provided with a second open groove 115, and the inner edge of the top opening of the upper casing is provided with a second opening 219 corresponding to the second clamping part. The second opening 219 and the first opening 218 are symmetrically arranged with respect to the first axial section of the upper casing, and the second transverse strut 126 at the second end of the cat litter bin 120 is clamped in the second open groove 115 of the second rotating shaft 113.

When the rotating shaft of the cat litter bin 120 rotates to the position where the first open groove 114 corresponds to the first opening 218 and the second open groove 115 corresponds to the second opening 219, the cat litter bin 120 is in an unlocked state that can be separated and taken out from the upper casing.

When the rotating shaft of the cat litter bin 120 rotates to a position where the first open groove 114 does not correspond to the first opening 218, and the second open groove 115 does not correspond to the second opening 219, the cat litter bin 120 and the upper casing are in a mechanical locked state that cannot be separated and taken out.

In some embodiments, when the rotating shaft of the cat litter bin 120 rotates to a position where the first open groove 114 corresponds to the first opening and the second open groove 115 corresponds to the second opening, the opening surface of the cat litter bin 120 has the same orientation as the top opening of the outer side wall 412 of the upper casing.

In other embodiments, when the rotating shaft of the cat litter bin 120 rotates to a position where the first open groove 114 corresponds to the first opening and the second open groove 115 corresponds to the second opening, the opening face of the cat litter bin 120 is different from the top opening of the outer side wall 412 of the upper casing.

According to the cat litter box provided by the embodiment of the invention, the cabinet 110 is set as a box structure with an open top, and the open structure design is adopted; the cat litter bin is placed in the top opening of the cabinet 110, and the opening of the cat litter bin is in the same direction with the top opening of the cabinet 110, so that the open structure at the top of the cabinet 110 provides a convenient operating space for users, Moreover, the cat litter bin is connected with the gear transmission mechanism 140 in the casing 110, so that the cat litter bin can be switched between the locked state and the unlocked state under the drive of the driving motor and the gear transmission mechanism 140. When it needs to be disassembled for cleaning, it is only necessary to drive the cat litter bin 120 to rotate until the opening of the first open groove 114 corresponds to the first opening 218 and the second open groove 115 corresponds to the second opening. In the unlocked state, since the engaging position with the first open groove is set corresponding to the first opening 218 and the second open groove 115 is corresponding to the second opening, when the cat litter bin 120 is pulled out from the engaging position with the first open groove 114, the freedom in the path of the pulling-out direction is not limited, that is, there is no object blocked the pulling-out of the first end of the cat litter bin, so that the cat litter bin 120 can be conveniently taken out from the casing 110 without the need. The convenient disassembly and removal of the cat litter bin is realized, and the operation difficulty is reduced, so that it is convenient to replace or clean the cat litter bin.

In addition, in this embodiment, the gear transmission mechanism 140 is arranged at the side, and the composition structure of the gear transmission mechanism 140 is innovatively improved, which can improve the situation that the cat litter bin is prone to jam or even unable to dump animal feces due to insufficient torque during rotation, thus improving the working reliability of the cat litter bin.

It should be noted that, in this paper, except for the first priority and second priority, which indicate the first and second qualifiers in the queue priority, other relational terms such as first and second are only used to distinguish one entity or operation from another, and do not necessarily require or imply that there is any such actual relationship or order between these entities or operations. Moreover, the terms "containing", "including" or any other variation thereof are intended to cover non-exclusive inclusion, so that a process, method, article or equipment including a series of elements includes not only those elements, but also other elements not explicitly listed or elements inherent to such process, method, article or equipment. Without further restrictions, an element defined by the phrase "including one" does not exclude the existence of other identical elements in the process, method, article or equipment including the element.

Each embodiment in this specification is described in a related way, and only the same and similar parts between the embodiments can be referred to each other, and each embodiment focuses on the differences from other embodiments.

Although the present invention is disclosed above, the present invention is not limited thereto. Any person skilled in the technology can make various changes and modifications without departing from the spirit and scope of the invention, so the scope of protection of the invention should be based on the scope defined by the claims.

The invention claimed is:

1. A cat litter box, which is characterized by comprising:
   A casing comprising a box structure with an open top, and a bottom of the casing is provided with a collection bin for receiving cat feces and caked cat litter;
   A cat litter bin with a cavity structure and a cavity for accommodating cat litter, wherein the cat litter bin is located in the top opening of the casing and is correspondingly arranged above the collection bin;
   The side wall of the casing is provided with a rotatable first rotating shaft corresponding to the first end of the cat litter bin, the first rotating shaft is provided with a first clamping part towards the first end of the cat litter bin, and an inner edge of the top opening of the casing is provided with a first opening corresponding to the first clamping part, and the first end of the cat litter bin is clamped at the first clamping part of the first rotating shaft;
   A driving motor and a gear transmission mechanism arranged in the side wall of the casing, wherein the gear transmission mechanism is positioned above the side of the driving motor, a power input end of the gear transmission mechanism is connected with the output shaft of the driving motor, and the power output end of the gear transmission mechanism is arranged correspondingly to and clamped with the second end of the cat litter bin;
   When the driving motor drives the gear transmission mechanism to drive the cat litter bin to rotate until the first end of the cat litter bin is clamped with the first clamping part of the first rotating shaft corresponding to the first opening, the cat litter bin and the casing are in a separable unlocked state;
   When the clamping position between the first end of the cat litter bin and the first clamping part of the first rotating shaft does not correspond to the first opening, the cat litter bin and the casing are in an inseparable mechanical locked state.

2. The litter box according to claim 1 is characterized in that a second rotating shaft is arranged on the side wall of the casing corresponding to the second end of the litter box, and a second clamping part is arranged on the circumferential surface of the second rotating shaft facing the second end of the litter box, and the inner edge of the top opening of the casing is provided with a second opening corresponding to the second clamping part, which is symmetrically arranged with the first opening with respect to the first axial section of the casing, the second end of the cat litter bin is clamped on the second clamping part of the second rotating shaft, and the other end of the second rotating shaft is connected to the power output end of the gear transmission mechanism.

3. The cat litter box according to claim 2, wherein a first transverse strut is arranged at the first end of the cat litter box, and a second transverse strut is arranged at the second end of the cat litter box;
   The side wall of the upper half of the casing includes a hollow structure formed by connecting the inner and outer side walls at the top, and the inner side wall of the upper half of the casing is provided with a first mounting hole corresponding to the first rotating shaft, and the first rotating shaft passes through and is supported on the first mounting hole, and the first opening intersects with the first mounting hole downward along the inner edge of the top opening of the casing;
   The inner side wall of the upper half of the casing is provided with a second mounting hole corresponding to the second rotating shaft, and the second rotating shaft passes through and is supported on the second mounting hole, and the second opening penetrates the second mounting hole downward along the inner edge of the top opening of the casing;
   The first clamping part is a first open groove formed on the circumferential surface of the first end of the first rotating shaft, the second clamping part is a second open groove formed on the circumferential surface of the second end of the first rotating shaft, the first transverse strut is arranged in the first open groove, and the second transverse strut is arranged in the second open groove; Among them;
   When the rotating shaft of the cat litter bin rotates to the position where the first open groove corresponds to the first opening and the second open groove corresponds to the second opening, the cat litter bin is in an unlocked state that can be separated and taken out from the casing;
   When the rotating shaft of the cat litter bin rotates to a position where the first open groove does not correspond to the first opening and the second open groove does not correspond to the second opening, the cat litter bin and the casing are in a mechanical locked state that cannot be separated and taken out.

4. The litter box according to claim 3, characterized in that the gear transmission mechanism comprises a reduction gear set and a spur gear;

The reduction gear set comprises a gear mounting casing connected to the side wall of the upper half of the casing, a bevel gear and a differential gear located in the gear mounting casing, wherein the driving motor is correspondingly arranged at the side of the bevel gear, and the axle of the bevel gear is connected to the output shaft of the driving motor;

The differential gear comprises a high-speed input end and a low-speed output end, the bevel gear is meshed with the high-speed input end of the differential gear, the low-speed output end of the differential gear is meshed with the teeth of the spur gear, and the spur gear is connected with one end of the second rotating shaft away from the cat litter bin in the axial direction.

5. The litter box according to claim 4 is characterized in that the second rotating shaft is integrally formed with the spur gear, or the second rotating shaft is fixedly connected to one end of the spur gear along the axial direction.

6. The litter box according to claim 1, characterized in that a litter separation grid is arranged in the cavity of the litter box along the direction of the rotating shaft of the litter box, the litter separation grid is supported in the cavity, and has a plurality of evenly arranged grid bars, and intervals for forming grid holes are arranged between adjacent grid bars, and the grid holes are configured to block and separate the litter solid foreign matter with predetermined granularity.

7. The cat litter box according to claim 6, wherein the cat litter separation grid comprises a support bracket, a suspension plate and a separation grid plate, wherein the support bracket is buckled on the opening edge of the cat litter bin, three edges of the suspension plate are clamped on the support bracket, the end of one edge of the suspension plate is provided with a connecting part, and two ends of the separation grid plate are vertically drooped and connected to the connecting part, and the separation grid plate comprises a self-locked.

8. The litter box according to claim 1, characterized in that a control mainboard is arranged on the casing, a Hall sensor is arranged on the inner wall of the casing near the top, and is within the rotation path range of the litter box, and the Hall sensor is electrically connected with the control mainboard and configured to inductively detect the rotation position of the litter box.

9. The litter box according to claim 8, characterized in that a motion sensor is further arranged on the inner wall of the casing near the top, and the sensing element of the motion sensor faces the external area environment opposite to the opening of the litter box, and the motion sensor is electrically connected with the control mainboard and is configured to detect whether there is a moving object near the opening of the litter box in the external area environment and feed it back to the control mainboard.

10. The litter box according to claim 1, wherein the collection bin comprises a bottom plate and a side wall extending upward around the bottom plate, and an infrared sensor is arranged on the side wall of the collection bin, which is electrically connected with the control mainboard, and the probe of the infrared sensor is arranged towards the inside of the collection bin and is configured to detect whether the product in the collection bin reaches a predetermined height.

11. The litter box according to claim 10, characterized in that a living creature radar is further arranged on the inner wall of the casing near the top, and the probe of the living creature radar is arranged towards the opening of the litter box, and is configured to detect whether there are objects with vital signs in the litter box.

12. The litter box according to claim 11, characterized in that weighing sensors are respectively arranged at the positions near the four corners at the bottom of the casing, and the weighing sensors are electrically connected with the control mainboard, wherein at least two weighing sensors are arranged at the same side of the live radar and are configured to cooperate with the live radar to detect whether an object with vital signs enters the litter box.

13. The litter box according to claim 1, characterized in that the side wall of the bottom of the casing is also provided with an open groove, which penetrates into the interior of the casing, and an aromatherapy box is embedded in the open groove, and the aromatherapy box is configured to place aromatherapy;

One side of the aromatherapy box facing the collection bin at the bottom of the casing is provided with a vent hole, and an axial fan is arranged in the casing at the position corresponding to the vent hole, and the axial fan is configured to blow the fragrance emitted in the aromatherapy box into the collection bin through the vent hole.

14. The litter box according to claim 1, wherein the axis of the rotating shaft formed by connecting the center of the first end face and the center of the second end face of the litter box is located on the vertical center face of the cavity of the litter box.

15. The litter box according to claim 14, wherein the rotation angle of the litter box is 25°-75°.

16. The litter box according to claim 1, characterized in that the litter box has a roughly hemispherical cavity structure, and when the litter box is rotated until the first end of the litter box is clamped with the first clamping part of the first rotating shaft corresponding to the first opening, the opening surface of the litter box is arranged in the same direction as the top opening of the casing.

17. The cat litter box according to claim 1, wherein the cat litter box has a roughly hemispherical cavity structure, and the cat litter box is configured to rotate until the first end of the cat litter box is clamped with the first clamping part of the first rotating shaft corresponding to the first opening, and the opening surface of the cat litter box is different from the top opening direction of the casing.

18. A cat litter box is characterized by comprising:

An upper casing comprising an outer side wall and an inner cavity with an open top arranged in the outer side wall, a hollow space is arranged between the outer side wall and the inner cavity, and a through blanking hole is arranged at the bottom of the inner cavity;

a lower casing is connected with the bottom of the outer side wall of the upper casing, and the bottom of the lower casing is provided with a collection bin for receiving cat feces and caked cat litter up and down corresponding to the blanking port;

A cat litter bin with an open cavity structure, which is located in the top opening of the inner cavity of the upper casing and above the blanking port at the bottom of the inner cavity, and has a cavity for accommodating cat litter inside;

a first end of the cat litter bin is provided with a first transverse strut, and the second end of the cat litter bin is provided with a second transverse strut;

a hollow space between the outer side wall of the upper casing and the inner cavity is provided with a rotatable first rotating shaft corresponding to the first end of the cat litter bin, the circumferential surface of the first rotating shaft facing the first end of the cat litter bin is provided with a first open groove, and the inner edge of the top opening of the upper casing is provided with a first opening corresponding to the first open groove, and the first end of the cat litter bin is clamped in the first opening of the first rotating shaft;

And a driving motor and a gear transmission mechanism arranged in the hollow space between the outer side wall of the upper casing and the inner cavity, wherein the gear transmission mechanism is positioned above the side of the driving motor, the power input end of the gear transmission mechanism is connected with the output shaft of the driving motor, the power output end of the gear transmission mechanism is arranged corresponding to the second end of the cat litter bin, and is clamped with the second transverse pillar at the second end of the cat litter bin;

The hollow space between the outer side wall of the upper casing and the inner cavity is provided with a second rotating shaft corresponding to the second end of the cat litter bin, and the second rotating shaft is provided with a second open groove facing the circumferential surface of the second end of the cat litter bin, and the inner edge of the top opening of the upper casing is provided with a second opening corresponding to the second clamping part, and the second opening and the first opening are symmetrically arranged with respect to the first axial section of the upper casing, and the second transverse strut of the second end of the cat litter bin;

When the rotating shaft of the cat litter bin rotates to the position where the first open groove corresponds to the first opening and the second open groove corresponds to the second opening, the cat litter bin is in an unlocked state that can be separated and taken out from the upper casing;

When the rotating shaft of the cat litter bin rotates to a position where the first open groove does not correspond to the first opening and the second open groove does not correspond to the second opening, the cat litter bin and the upper casing are in a mechanical locked state that cannot be separated and taken out.

19. The litter box according to claim 18, wherein when the rotating shaft of the litter box rotates to a position where the first open groove corresponds to the first opening and the second open groove corresponds to the second opening, the opening face of the litter box is in the same direction as the top opening of the inner cavity of the upper casing.

20. The litter box according to claim 18, wherein when the rotating shaft of the litter box rotates to a position where the first open groove corresponds to the first opening and the second open groove corresponds to the second opening, the opening face of the litter box is different from the top opening of the inner cavity of the upper casing.

* * * * *